Aug. 28, 1934.  J. M. SHIMER  1,971,733
PUMP SUCTION STRAINER
Filed Oct. 23, 1930
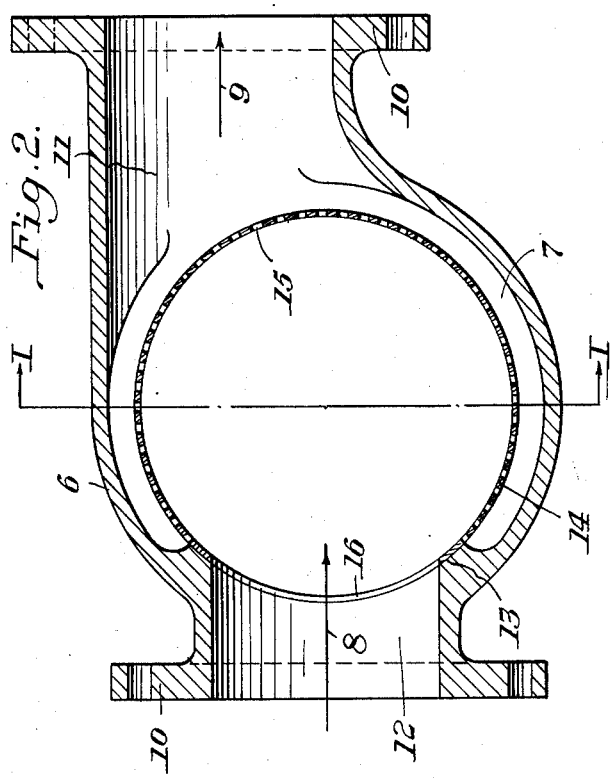
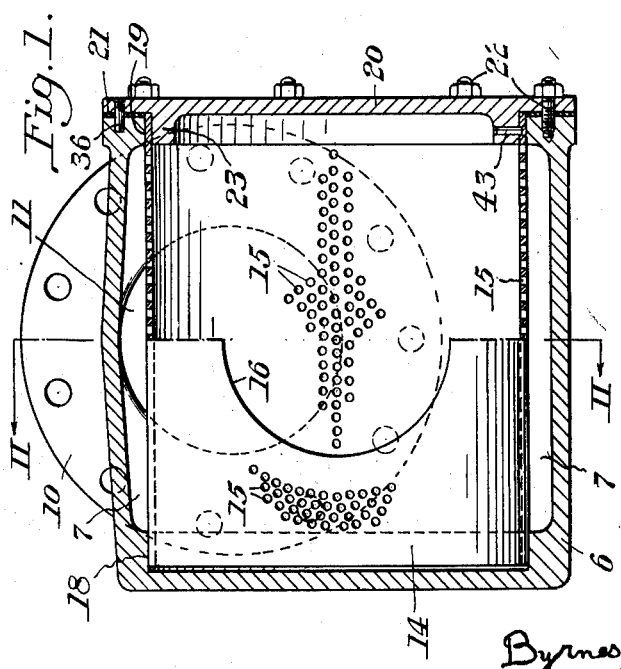
INVENTOR
John M. Shimer
by Byrnes, Stebbing, Parmelee & Blenko
His Attorneys.

Patented Aug. 28, 1934

1,971,733

UNITED STATES PATENT OFFICE 1,971,733

PUMP SUCTION STRAINER

John M. Shimer, Wilkinsburg, Pa., assignor to Wilson-Snyder Manufacturing Corporation, Braddock, Pa., a corporation of Pennsylvania Application October 23, 1930, Serial No. 490,663

1 Claim. (Cl. 210—164)

My invention relates to a strainer insertable in a conduit to free the same from foreign material. A strainer, when combined with the suction line of a pump in accordance with the principles of my invention, serves to efficiently strain out foreign material such as sticks of wood, pieces of cloth, stones or the like, which might be carried through the suction line, into the pump chamber and become lodged between a valve and its seat.

One object of my invention is to provide a strainer which not only has ample capacity to permit flow therethrough of as large a quantity of fluid as can be handled by the pump, but also to eliminate any air pockets which might be formed within the strainer causing it to become in part or in whole air bound so as to decrease efficiency. A further object of my invention is to provide a strainer which may be readily inserted and removed from a conduit without disconnecting the housing or casing which constitutes the strainer chamber, and which may be reversed so as to be inserted in the conduit from the opposite side. All foreign material will be collected inside the strainer chamber and therefore will be automatically withdrawn from the strainer housing when removing the chamber. Further objects of my invention will become apparent in the course of the ensuing description, and will be more clearly pointed out in the accompanying claim.

In the accompanying drawing in which, for purposes of illustration and not as limiting my invention, I have shown three embodiments of pump suction strainers incorporating the principles of my invention.

Fig. 1 is a transverse sectional view through the strainer chamber of a conduit with inlet flange and outlet flange of the strainer housing in line with each other. The greater portion of this sectional view is taken on line I—I of Fig. 2; but the left half of the strainer is shown in elevation.

Fig. 2 is a longitudinal sectional view taken on line II—II of Fig. 1.

I have illustrated and am about to describe my invention in connection with the suction line of a pump. While it will be understood that my invention teaches certain principles which are more particularly related to a strainer connected in the suction line of a pump, certain aspects of my invention are applicable broadly to the straining of fluid during flow of the same. In the form illustrated in Figs. 1 and 2, the conduit 6 is provided with a strainer chamber 7 into which the fluid to be strained may flow as indicated by the arrow 8, and from which the strained fluid may flow as indicated by arrow 9. In the embodiment illustrated, the conduit 6 is shown as a short section having flanges 10 for connection into the suction line of a pump. The short section of conduit 6 constitutes a housing having a chamber 7; and the outlet 11 from this chamber merges gradually into the latter; but the inlet 12 into the chamber 7 is clearly defined by seating surfaces 13 which bound the inlet 12 on all sides. It will be noted that there are no pockets above the general level of the inlet 12 nor of the outlet 11 in which gas, such as air, may collect.

The strainer which I prefer to employ for the straining of fluid which passes from the inlet 12 to the outlet 11 is formed as a vessel 14 having a portion at least of its walls foraminous, as indicated by the perforations 15. The vessel 14 may have a shape suited to the particular conditions under which the strainer is to serve. I have illustrated in the drawing a strainer which I have found to be quite serviceable and which is cylindrical, with open ends. In addition to its open ends, the form of strainer shown in Figs. 1 and 2 is provided with a lateral opening 16 which registers with the inlet 12. The walls of the vessel 14 immediately surrounding the opening 16 engage the surfaces 13 so that fluid flowing in the direction of the arrows 8 and 9 will pass into the interior of the vessel 14 and out through the numerous perforations 15.

The walls of the strainer chamber 7 are spaced from the vessel 14 except at the three openings in this vessel. The engagement between the surface 13 and the walls surrounding the opening 16 has already been mentioned. A cylindrical recess 18 is provided in one side of the chamber 7 to receive the end of the vessel 14. The vessel 14 is shown as being open at both ends; and this facilitates cleaning of the vessel; but it is to be understood that this invention is not limited to a vessel which has both ends open, since it would be practical to clean the vessel through one end or through the opening 16 alone.

The other end of the vessel 14 fits a cleaning opening 19 in the other side wall of the chamber 7. This opening 19 is normally closed by a plate 20, packing 21 being provided to render the closure fluid and air tight and bolts 22 being employed to secure the plate 20 in place. An annular flange 23 extends inwardly from the plate 20, this flange fitting closely within the open end of the vessel 14 and being connected rigidly to the latter by a rivet 43. Since the plate 20 is formed integrally with flange 23 and the strainer vessel 14 is riveted to the flange 23, the strainer vessel 14 will be properly positioned with the opening 16 registering with the inlet 12 if the plate 20 is properly assembled with the housing 6. In order to ensure assembling of the plate 20 in proper relation to the housing 6, I may irregularly space the bolts 22 about the periphery of the plate 20; but I prefer to mount a dowel pin 36 in the plate 20, and form a cooperating opening in such position in the housing 6 that the vessel 14 cannot be positioned in the strainer chamber 7 without registering its opening 16 with the inlet 12. It is apparent now, that in order to clean out the strainer, plate 20 with vessel 14 attached is detached from housing 6, and is withdrawn from chamber 7 thus removing all foreign material which collected inside of the vessel 14 from the housing 6. The strainer as illustrated on Figs. 1 and 2 handles the fluid in a straight stream from 8 to 9 as indicated by direction lines; and the top of this stream is flat except where it steps up from the level of the inlet to the level of the outlet. Accordingly, there is no difficulty from the trapping of gas such as air.

I claim:

In combination, a generally horizontal conduit having a strainer chamber, an inlet to the chamber, and an outlet therefrom, the top of the flow space through said inlet, said strainer chamber, and said outlet being a rising series of flat steps; and a cylindrical strainer diposed horizontally in said strainer chamber, said strainer having a lateral opening registering with said inlet, the walls of said strainer chamber being spaced from the periphery of said cylindrical strainer except adjacent said lateral opening, and adjacent the ends of said cylindrical strainer.

JOHN M. SHIMER.